No. 753,848. Patented March 8, 1904.

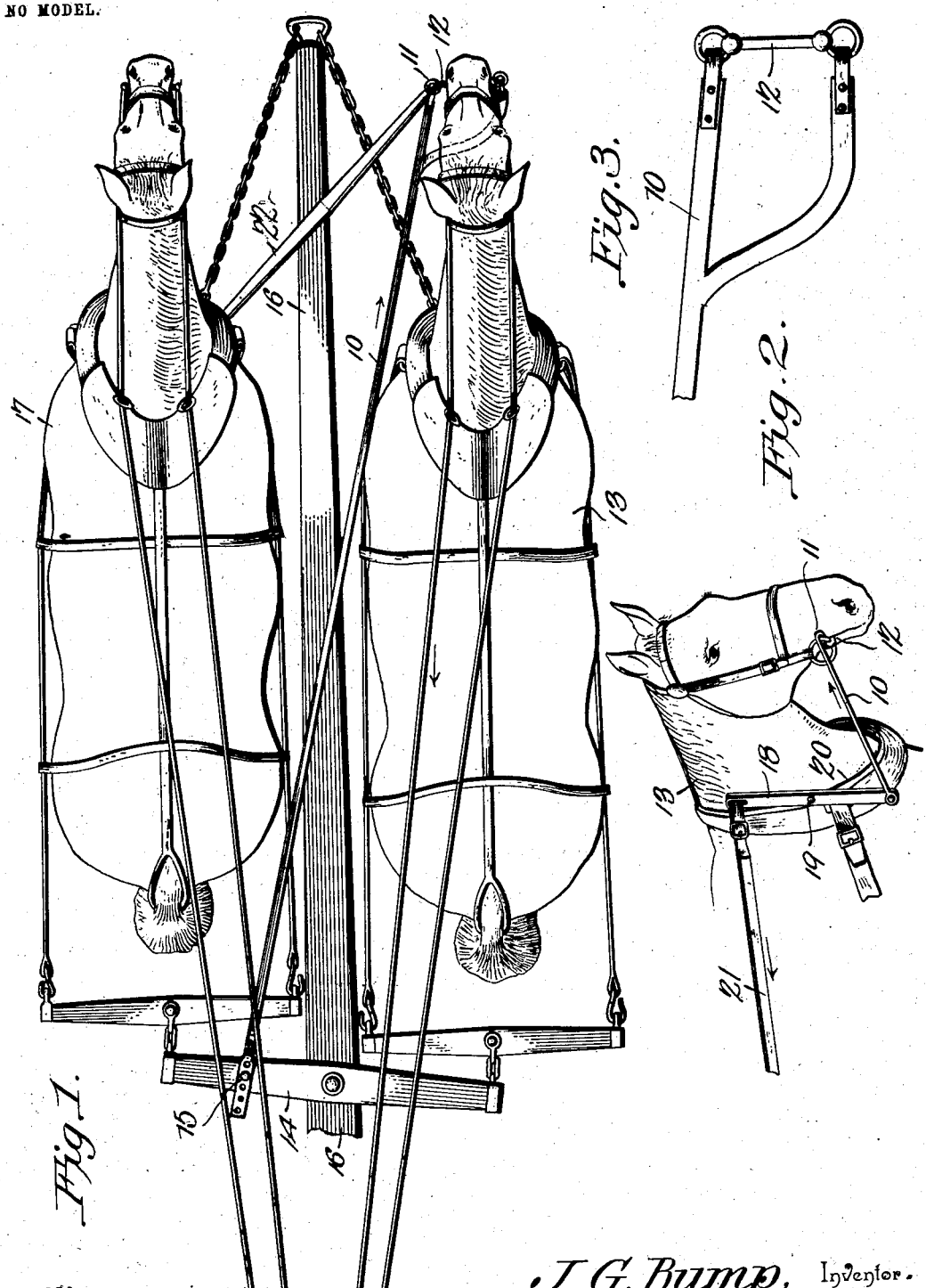

UNITED STATES PATENT OFFICE.

JAMES G. BUMP, OF BRAD, TEXAS.

HORSE-BREAKING DEVICE.

SPECIFICATION forming part of Letters Patent No. 753,848, dated March 8, 1904.

Application filed June 30, 1903. Serial No. 163,756. (No model.)

*To all whom it may concern:*

Be it known that I, JAMES G. BUMP, a citizen of the United States, residing at Brad, in the county of Palo Pinto and State of Texas, have invented a new and useful Horse-Breaking Device, of which the following is a specification.

This invention relates to devices employed for breaking horses from "balking," and has for its object to produce a device which may be applied without injury to the horse or change in the harness or vehicle; and it consists in a bar or rod adapted for attachment to the bit of the horse to be treated and extending rearwardly and adapted when moved forwardly to exert a pushing force against the bit from the rear, and thus correspondingly force the horse forward.

The invention further consists in a bar or rod adapted for connection by one end to the bit of the horse and extended rearwardly and connected to a lever operative by the driver.

The invention further consists in a bar or rod adapted for connection by one end to the bit of the horse and with the other end connected to the doubletree in position to exert a pushing force upon the bar when the other or non-balky horse moves forward.

The invention further consists in a bar or rod connected by one end to the bit of the balky horse and by the other end to some part of the harness, such as the hames of the non-balky horse, so that at the forward movement of the latter the balky horse will be correspondingly moved and likewise prevented from turning his head toward the non-balky horse.

Other novel features of the invention will appear in the annexed specification and be specified in the claims following.

In the drawings illustrative of the invention, in which corresponding parts are designated by like designating characters, Figure 1 is a view from above of a team of horses with the improvement applied. Fig. 2 is a view of the head of a horse with a modified form of the device applied. Fig. 3 is a detail, enlarged, illustrating the means of attachment to the bit.

The improved device may be applied to one of the horses of a team or to a single horse; but generally the device will be first applied to the balky horse hitched to a vehicle with a non-balky horse and utilizing the latter to operate the device and force the balky horse forward, and then after the horse is partially broken of the balky habit the device may be applied directly to the balky animal and operated by the driver. The completion of the cure, however, may be entirely accomplished in connection with the two horses hitched as a team or to a single horse, as may be preferred.

For the purpose of illustration the device is shown in Fig. 1 applied to one horse of a team, and in Fig. 2 to a single horse.

The improved device consists of a bar or rod 10, having means by which it may be connected by its forward end to the bit 12 of the "balky" horse (represented at 13) and extending rearwardly, as shown. The bar 10 is preferably recessed or forked at the outer end, with a strap or cord at each of the points or fork ends, whereby it may be connected to the bit at each side, as shown in Fig. 3. By this means the forward pressure is exerted beneath the chin and entirely upon the bit, so that no strains occur upon the other parts of the harness. If required, an additional bar 22 may be attached to the bit 12 of the balky horse or to the bar 10 near the bit by one end and to the harness, such as the hames of the non-balky horse, as represented in Fig. 1, to prevent lateral movement of the head of the balky horse and also to prevent him from biting or otherwise annoying the non-balky horse. This is an important feature of the invention and adds materially to the value and efficiency of the device. When applied to one of the horses of a team, the rear end of the bar 10 passes to the doubletree 14, to which it is movably connected, as by a pivot-pin 15, on the opposite side of the tongue 16 from the horse to which the device is attached, or so that the non-balky horse (represented at 17) when moving forward will exert a leverage force upon the bar 10 and correspondingly exert a very strong pushing force upon the bit 12 of the balky horse and lead him forward. The doubletree thus becomes the operating-lever of the device. The rear end of the bar 10 will be provided with a plurality of appertures for the pin 15, spaced apart to provide for the adjustment between the bar and doubletree to adapt the device to different-sized horses. When applied to a single horse, the bar 10 is shorter, and a lever 18, corresponding to and performing the same function as the doubletree 14, is pivotally connected, as at 19, to some part of the harness, such as the hames 20, and a draw-strap 21 led from its free end to the vehicle convenient to the hand of the driver. By this simple arrangement the driver by pulling upon the draw-cord may cause the bar to exert a strong pushing force upon the bit in the same manner as illustrated in Fig. 1.

By this simple means a horse will be effectually cured of the balking habit and without injury to the animal or structural change in the harness or running-gear or other parts of the vehicle.

The bar 10 and other parts may be modified to adapt the device to horses and vehicles of various sizes without departing from the principle of the invention or sacrificing any of its advantages.

Having thus fully described my invention, what I claim is—

1. In a device of the class described, a bar adapted for connection with the bit of a horse and extending rearwardly, a lever-arm movably attached to the rear end of said bar, means for operating said lever to cause said bar to exert a pushing force upon said bit, and a stay-bar connected with the bit of the horse under treatment and with the harness of the other horse.

2. In a device of the class described, a bar adapted for connection with the bit of the horse and extending rearwardly, a lever-arm movably connected to the rear end of said bar, and means for forcibly operating said lever to cause said bar to exert a forwardly or pushing force upon said bit and the jaws of the horse, substantially as described.

3. In a device of the class described, a bar adapted for connection with the bit of the horse and extending rearwardly and movably connected by its rear end to the doubletree at the opposite side of the tongue from the horse to whose bit the device is attached, substantially as described.

4. In a device of the class described, a bar adapted for connection with the bit of the horse to be treated and extending rearwardly and movably connected at its rear end to the doubletree on the opposite side of the draft-tongue from the horse to whose bit the device is attached, and a stay-bar connected between the bit of the horse to be treated and the harness, such as the hames, of the other or companion horse, substantially as described.

In testimony that I claim the foregoing as my own I have hereto affixed my signature in the presence of two witnesses.

JAMES G. BUMP

Witnesses:
J. P. CORRIGAN,
DAN COBB.